M. J. B. BARBAROU.
METHOD OF MOUNTING THE PROPELLER SHAFTS AT THE FRONT OF MOTORS.
APPLICATION FILED APR. 7, 1916. RENEWED MAY 29, 1919.

1,315,654.

Patented Sept. 9, 1919.

INVENTOR
Marius Jean Baptiste Barbarou
BY
ATTORNEY

UNITED STATES PATENT OFFICE.

MARIUS JEAN BAPTISTE BARBAROU, OF NEUILLY-SUR-SEINE, FRANCE.

METHOD OF MOUNTING THE PROPELLER-SHAFTS AT THE FRONT OF MOTORS.

1,315,654.            Specification of Letters Patent.        Patented Sept. 9, 1919.

Application filed April 7, 1916, Serial No. 89,569. Renewed May 29, 1919. Serial No. 300,787.

*To all whom it may concern:*

Be it known that I, MARIUS JEAN BAPTISTE BARBAROU, citizen of the Republic of France, residing at 24 Rue Saint James, Neuilly-sur-Seine, Seine, in the Republic of France, have invented new and useful Improvements in Methods of Mounting the Propeller-Shafts at the Front of Motors, of which the following is a specification.

The present invention relates to a special method of construction regarding the mounting of the propeller shaft at the front of the motor.

In the present construction, the propeller is mounted upon the forward part of the cam shaft, as prevails in numerous known motors.

To provide for the case where the balance of the propeller is not perfect, either on account of a part of the propeller being broken off or from any cause due to the working of the mechanism itself, the cam shaft must be held in the proper manner in order to withstand the strain which is due to this unbalancing of the propeller.

Figure 1:
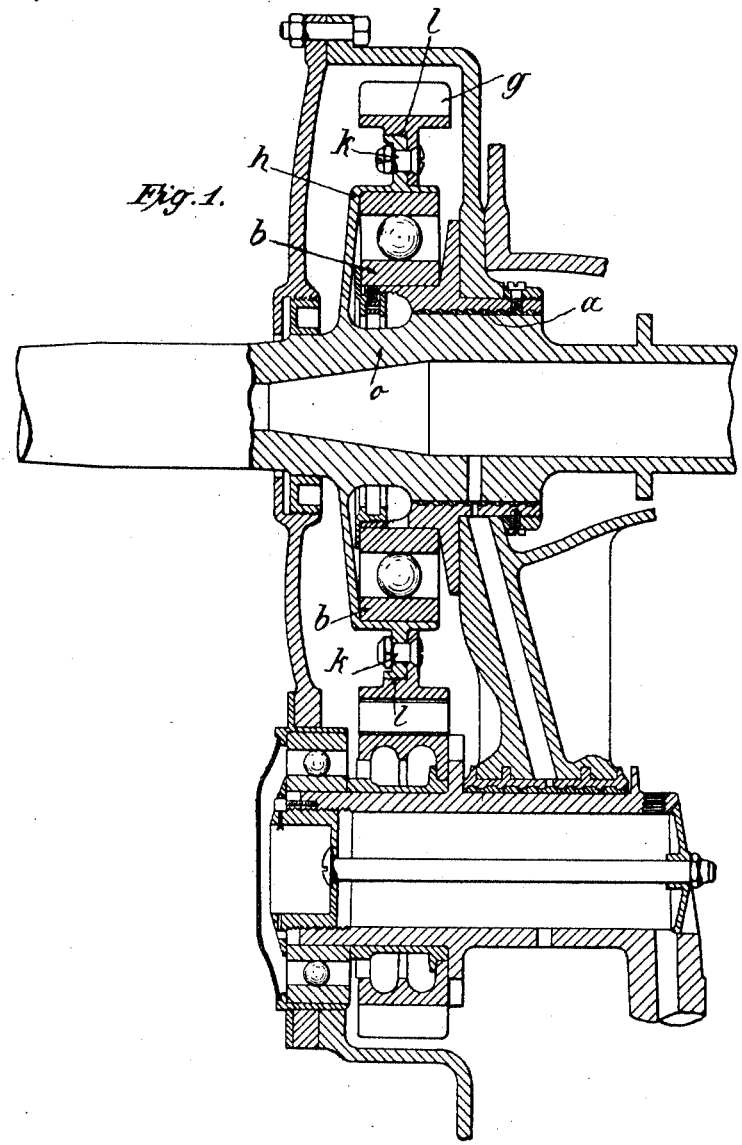
Figure 1 shows an example of the execution of new method of mounting, in longitudinal section taken upon the propeller shaft.
Figure 2:
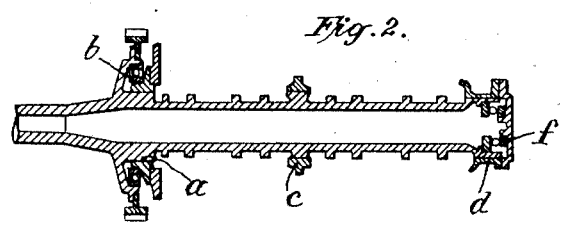
Fig. 2 is a view made on a small scale which represents the assemblage of the propeller shaft with its several bearing points and its thrust bearing.

In the present new construction, referring to Fig. 2, the bearing points of the shaft are the following: at the front part, the ordinary bearing $a$ and the ball-bearing $b$; near the middle, the bearing $c$; and at the rear end the bearing $d$; moreover, provision is made to receive the thrust of the propeller at the rear end of the shaft which lies at the opposite end from the part carrying the propeller, and this method of construction allows of mounting a thrust ball-bearing $f$ which has the smallest size that the load and the speed will allow of using.

An advantage is secured by the present arrangement of thrust ball-bearing of small size, for it should be remarked that other things being equal it is preferable to employ a thrust ball-bearing of small diameter rather than such a bearing having an equal strength but a large diameter, and all the more so in the case where the shaft working against the bearing rotates at higher speed.

The combined form of mounting, which is placed at the front part and is composed of the ball-bearing $h$ and the ordinary bearing $a$, provides a great resistance against any possible deformation of the shaft; it prevents any displacement of the driving gear $g$ out of the plane which lies perpendicular to the direction of rotation, by reason of the shape which is given to the cup $h$ connecting the gear $g$ to the shaft proper $o$ and in this way all vibrations of the cup are avoided.

The driving gear $g$ is connected to the shaft by means of the bolts $k$ and also by the use of the screw thread $l$ the direction of the screw thread $l$ being such that the normal action of the motor always tends to keep it screwed tightly upon the cup, which latter forms part of the shaft.

By the use of an arrangement of this kind, the driving action of the shaft is carried out not only through the surface of the bolts but also upon the whole of the periphery by means of the screw thread of large diameter. Such an arrangement avoids all loosening and wear at the bolt holes and consequently all shocks and vibrations which may result from such cause.

Having now described my invention, what I claim as new and desire to secure by Letters Patent is:

1. In a device of the character specified, the combination of a shaft, a bearing therefor, a cup-shaped supporting-member carried by said shaft and having a radially projecting flange, a driving gear secured to said flange, and a ball bearing interposed between the lateral wall of said member and the bearings of said shaft.

2. In a device of the character specified, the combination of a shaft, a bearing therefor, a cup-shaped supporting-member integral with and projecting radially from said shaft and having its lateral wall axially parallel to said shaft, a flange projecting radially from the lateral wall of said member, a driving gear secured to said flange, and an anti-friction bearing interposed between the lateral wall of said member and the bearing of said shaft.

In testimony whereof I have signed my name to this specification in the presence of two subscribing witnesses.

MARIUS JEAN BAPTISTE BARBAROU.

Witnesses:
ANTOINE LAVOIX,
CHAS. P. PRESSLY.